US007523665B2

United States Patent
Katsumata et al.

(10) Patent No.: US 7,523,665 B2
(45) Date of Patent: Apr. 28, 2009

(54) ANGULAR VELOCITY SENSOR AND METHOD FOR OPERATING THE SAME

(75) Inventors: Takashi Katsumata, Kariya (JP); Takeshi Ito, Okazaki (JP); Hirofumi Higuchi, Okazaki (JP); Mutsuhito Ogino, Okazaki (JP); Tetsuya Morishima, Ichinomiya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 289 days.

(21) Appl. No.: 11/653,344

(22) Filed: Jan. 16, 2007

(65) Prior Publication Data
US 2007/0199377 A1  Aug. 30, 2007

(30) Foreign Application Priority Data

Feb. 28, 2006 (JP) .............................. 2006-052094
Sep. 26, 2006 (JP) .............................. 2006-260603

(51) Int. Cl.
*G01P 15/125* (2006.01)
(52) U.S. Cl. .............. 73/514.32; 73/504.02; 73/514.02; 361/280
(58) Field of Classification Search .............. 73/504.01, 73/504.02, 504.03, 509, 511, 514.02, 514.27, 73/514.32, 488, 862; 361/280
See application file for complete search history.

(56) References Cited

U.S. PATENT DOCUMENTS 6,023,974 A * 2/2000 Hara et al. ............... 73/504.15
6,151,966 A * 11/2000 Sakai et al. ............... 73/514.32
6,308,568 B1 * 10/2001 Moriya ..................... 73/504.13
6,666,091 B2 * 12/2003 Hatanaka et al. ......... 73/504.16
7,134,336 B2 * 11/2006 Mase et al. ............... 73/504.12
7,318,348 B2 * 1/2008 Ogino ....................... 73/504.14
2003/0029239 A1 * 2/2003 Hatanaka et al. ......... 73/504.16
2005/0204815 A1 * 9/2005 Mase et al. ............... 73/504.12
2005/0274181 A1 * 12/2005 Kutsuna et al. .......... 73/504.12
2008/0060437 A1 * 3/2008 Mase ........................ 73/504.14

FOREIGN PATENT DOCUMENTS

JP    A-2006-071335    3/2006

* cited by examiner

*Primary Examiner*—Hezron Williams
*Assistant Examiner*—Samir M Shah
(74) *Attorney, Agent, or Firm*—Posz Law Group, PLC

(57) ABSTRACT

An angular velocity sensor includes first and second vibrators having a movable portion with driving and detecting purpose movable electrodes and a fixed portion with first and second side driving and detecting purpose fixed electrodes. The driving voltages applied to the first side driving purpose fixed electrode in the first vibrator is a first driving voltage including direct and alternating voltages. The driving voltage applied to the second side driving purpose fixed electrode in the first vibrator is a second driving voltage including direct and alternating voltages. At least one of the direct voltages, one of the alternating voltages, or one of duty ratios of the first and second driving voltages is controlled so that the first vibrator vibrates opposite to the second vibrator.

19 Claims, 8 Drawing Sheets

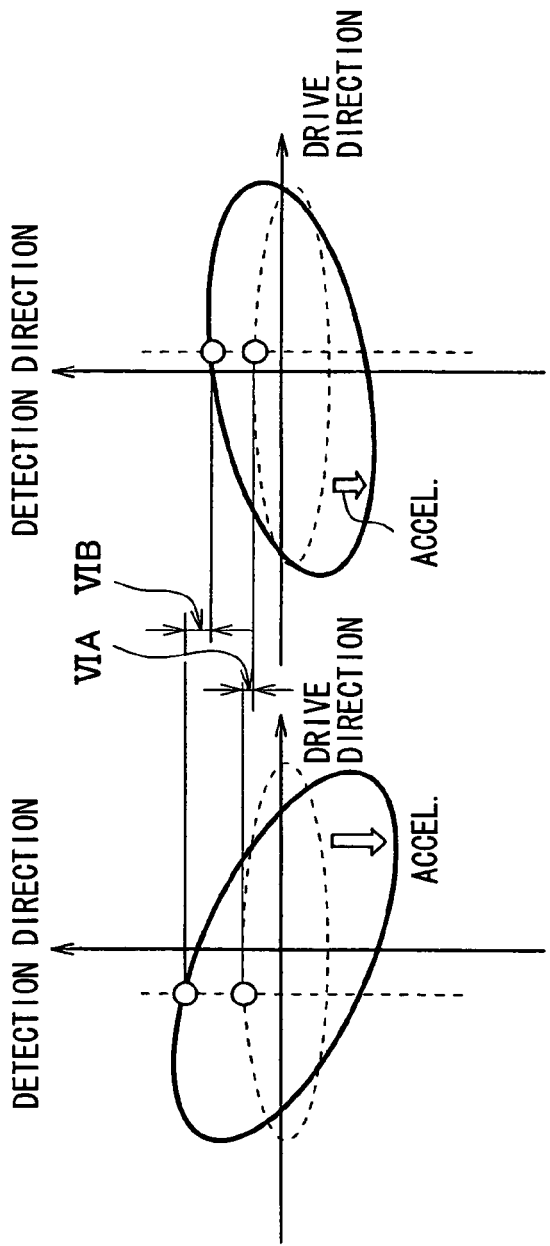
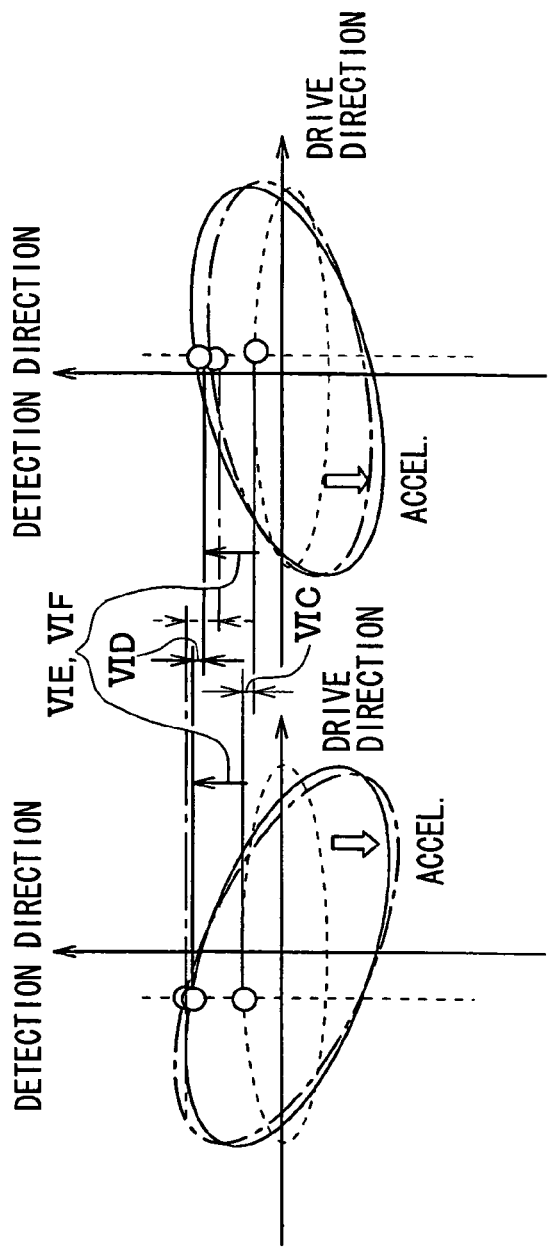
FIG. 6A
FIG. 6B

ANGULAR VELOCITY SENSOR AND METHOD FOR OPERATING THE SAME

CROSS REFERENCE TO RELATED APPLICATIONS

This application is based on Japanese Patent Applications No. 2006-52094 filed on Feb. 28, 2006, and No. 2006-260603 filed on Sep. 26, 2006, the disclosures of which are incorporated herein by reference.

FIELD OF THE INVENTION

The present invention relates to an angular velocity sensor and a method for manufacturing the same.

BACKGROUND OF THE INVENTION

In an angular velocity sensor, a movable electrode and a fixed electrode are disposed on a support substrate so as to oppose to each other, and an applied angular velocity is detected on the basis of the change of the distance between the movable electrode and the fixed electrode as is attendant upon the application of the angular velocity.

In an angular velocity sensor such as a micro-gyro sensor of electrostatic drive/capacitance detection type, when an angular velocity is to be detected, a driving voltage is applied between a fixed electrode and a movable electrode for drive, thereby to generate a potential difference and to vibrate a movable portion in one direction parallel to the substrate surface of a support substrate. On this occasion, when the angular velocity is applied, the angular velocity detecting interval between the movable electrode and the fixed electrode as is provided in the movable portion changes in accordance with the applied angular velocity, and hence, an output corresponding to the angular velocity is generated on the basis of a capacitance change based on the change of the interval (refer to, for example, U.S. Pat. No. 6,151,966).

However, the interval between both the electrodes is changed, not only by the angular velocity, but also by an external acceleration, and a capacitance change based on the change of the interval attributed to the acceleration is also outputted. This output becomes noise for the gyro sensor, which ought to detect the angular velocity.

In order to reduce the external acceleration output, therefore, the prior art has adopted a method wherein two vibrators of identical shape are arrayed and driven in reverse phases, and the differential output between the capacitance changes of the two vibrators is derived, whereby the external acceleration output is canceled, and only the angular velocity output is obtained.

In the above case, it has been verified, however, that the method cannot attain a satisfactory canceling effect, but that it generates the output ascribable to the external acceleration. Thus, it is an important problem to reduce the output ascribable to the external acceleration, and a method for solving the problem is desired.

SUMMARY OF THE INVENTION

In view of the above-described problem, it is an object of the present disclosure to provide an angular velocity sensor. It is another object of the present disclosure to provide a method for manufacturing the same.

According to a first aspect of the present disclosure, an angular velocity sensor includes: a support substrate; and first and second vibrators disposed on the support substrate. Each vibrator includes a movable portion and a fixed portion. The movable portion of each vibrator has a driving purpose movable electrode and a detecting purpose movable electrode. The movable portion is movably supported on the support substrate so that the movable portion is movable in a horizontal direction parallel to a surface of the support substrate. The fixed portion of each vibrator has a driving purpose fixed electrode and a detecting purpose fixed electrode. The fixed portion is fixed on the support substrate. The driving purpose fixed electrode faces the driving purpose movable electrode, and the detecting purpose fixed electrode faces the detecting purpose movable electrode. The first vibrator has a predetermined construction, which is symmetric to a construction of the second vibrator. The movable portion of each vibrator has a part capable of vibrating in a vibration direction parallel to the horizontal direction by applying a driving voltage between the driving purpose fixed electrode and the driving purpose movable electrode. The part of movable portion of each vibrator is capable of oscillating in an oscillation direction perpendicular to the vibration direction by a Coriolis force, which is generated by an angular velocity applied to the part of the movable portion. A capacitance between the detecting purpose fixed electrode and the detecting purpose movable electrode is changeable in accordance with an oscillation of the part of the movable portion. The angular velocity is detected based on a capacitance change between the detecting purpose fixed electrode and the detecting purpose movable electrode. The driving purpose fixed electrode in the first vibrator includes a first side driving purpose fixed electrode and a second side driving purpose fixed electrode. The driving purpose fixed electrode in the second vibrator includes a first side driving purpose fixed electrode and a second side driving purpose fixed electrode. The driving voltage applied to the first side driving purpose fixed electrode in the first vibrator is defined as a first driving voltage, and the driving voltage applied to the second side driving purpose fixed electrode in the second vibrator is the first driving voltage. The first driving voltage includes a direct voltage defined as A volts and an alternating voltage defined as B volts so that the first driving voltage is described as A+B volts. The driving voltage applied to the second side driving purpose fixed electrode in the first vibrator is defined as a second driving voltage, and the driving voltage applied to the first side driving purpose fixed electrode in the second vibrator is the second driving voltage. The second driving voltage includes a direct voltage defined as C volts and an alternating voltage defined as D volts so that the second driving voltage is described as C+D volts. The alternating voltage of the first driving voltage has a predetermined phase, which is opposite to a phase of the alternating voltage of the second driving voltage. At least one of the direct voltages in the first and second driving voltages is controlled in such a manner that the first vibrator vibrates the movable portion with a predetermined phase, which is opposite to a phase of the movable portion in the second vibrator, at least one of the alternating voltages in the first and second driving voltages is controlled in such a manner that the first vibrator vibrates the movable portion with a predetermined phase, which is opposite to a phase of the movable portion in the second vibrator, or at least one of duty ratios of the first and second driving voltages that are set to be a rectangular wave is controlled with reference to a center value of the duty ratios of the rectangular waves in such a manner that the first vibrator vibrates the movable portion with a predetermined phase, which is opposite to a phase of the movable portion in the second vibrator.

In the above sensor, the output caused by an external acceleration is sufficiently cancelled, so that the output attributed to the acceleration is minimized.

According to a second aspect of the present disclosure, a method for operating an angular velocity sensor, which includes a support substrate and first and second vibrators, is provided. Each vibrator includes a movable portion and a fixed portion. The movable portion of each vibrator has a driving purpose movable electrode and a detecting purpose movable electrode. The movable portion is movably supported on the support substrate so that the movable portion is movable in a horizontal direction parallel to a surface of the support substrate. The fixed portion of each vibrator has a driving purpose fixed electrode and a detecting purpose fixed electrode. The fixed portion is fixed on the support substrate. The driving purpose fixed electrode faces the driving purpose movable electrode, and the detecting purpose fixed electrode faces the detecting purpose movable electrode. The first vibrator has a predetermined construction, which is symmetric to a construction of the second vibrator. The movable portion of each vibrator has a part capable of vibrating in a vibration direction parallel to the horizontal direction by applying a driving voltage between the driving purpose fixed electrode and the driving purpose movable electrode. The part of movable portion of each vibrator is capable of oscillating in an oscillation direction perpendicular to the vibration direction by a Coriolis force, which is generated by an angular velocity applied to the part of the movable portion. A capacitance between the detecting purpose fixed electrode and the detecting purpose movable electrode is changeable in accordance with an oscillation of the part of the movable portion. The angular velocity is detected based on a capacitance change between the detecting purpose fixed electrode and the detecting purpose movable electrode. The driving purpose fixed electrode in the first vibrator includes a first side driving purpose fixed electrode and a second side driving purpose fixed electrode. The driving purpose fixed electrode in the second vibrator includes a first side driving purpose fixed electrode and a second side driving purpose fixed electrode. The driving voltage applied to the first side driving purpose fixed electrode in the first vibrator is defined as a first driving voltage, and the driving voltage applied to the second side driving purpose fixed electrode in the second vibrator is the first driving voltage. The first driving voltage includes a direct voltage defined as A volts and an alternating voltage defined as B volts so that the first driving voltage is described as A+B volts. The driving voltage applied to the second side driving purpose fixed electrode in the first vibrator is defined as a second driving voltage, and the driving voltage applied to the first side driving purpose fixed electrode in the second vibrator is the second driving voltage. The second driving voltage includes a direct voltage defined as C volts and an alternating voltage defined as D volts so that the second driving voltage is described as C+D volts, and the alternating voltage of the first driving voltage has a predetermined phase, which is opposite to a phase of the alternating voltage of the second driving voltage. The method includes: vibrating the first and second vibrators by applying the first and second driving voltages to the driving purpose fixed electrodes in the first and second vibrators, respectively; monitoring a sensor output with applying a predetermined acceleration; controlling at least one of the direct voltages in the first and second driving voltages in such a manner that the one of the direct voltages is changed by a predetermined amount with reference to a predetermined center value of the direct voltages, controlling at least one of the alternating voltages in the first and second driving voltages in such a manner that the one of the alternating voltages is changed by a predetermined amount with reference to a predetermined center value of the alternating voltages, or controlling at least one of duty ratios of the first and second driving voltages that are set to be a rectangular wave in such a manner that the one of the duty ratios is changed by a predetermined amount with reference to a center value of the duty ratios of the rectangular waves; and memorizing information about the predetermined amount in a memory when the sensor output is minimized.

In the above method, the output caused by an external acceleration is sufficiently cancelled, so that the output attributed to the acceleration is minimized.

BRIEF DESCRIPTION OF THE DRAWINGS

The above and other objects, features and advantages of the present invention will become more apparent from the following detailed description made with reference to the accompanying drawings. In the drawings:

FIG. 6A is a graph showing vibration locus of left and right vibrators when a first voltage is equal to a second voltage, and FIG. 6B is a graph showing vibration locus of left and right vibrators when a first voltage is different from a second voltage;

DETAILED DESCRIPTION OF THE PREFERRED EMBODIMENTS

The inventors have studied, and it has been verified that a conventional method cannot attain a satisfactory canceling effect, but that it generates the output ascribable to the external acceleration. A cause is that a difference exists in drive resonance frequencies on account of the discrepancy of the product finishes of the left and right vibrators.

Figure 7:
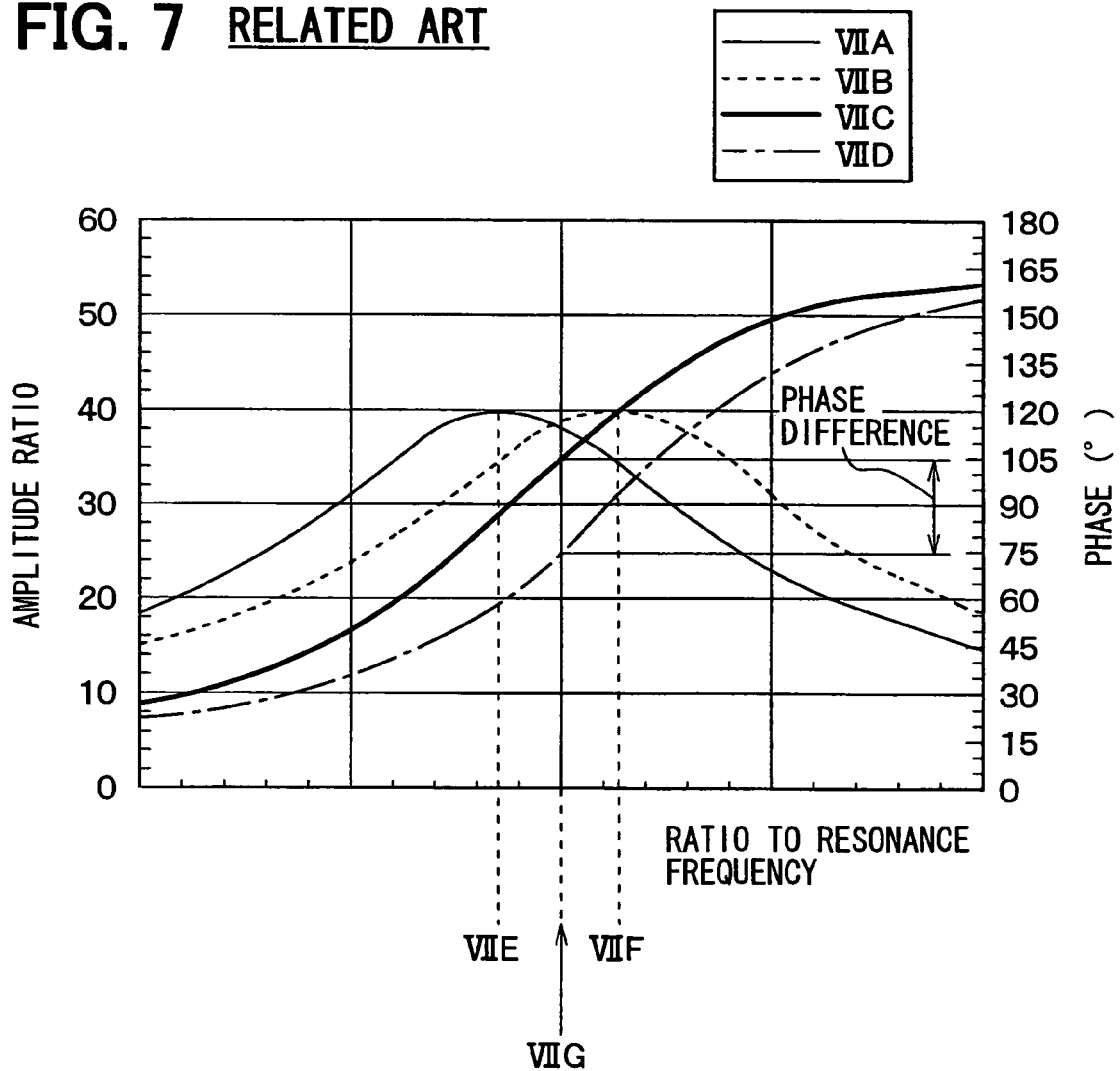
FIG. 7 is a graph showing output waveforms of the left and right vibrators when the left and right vibrators have manufacturing variation.
Figure 8B:
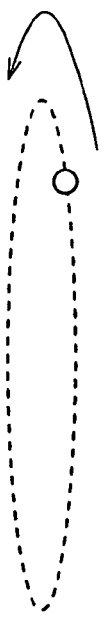
FIGS. 8A and 8B are views showing movement of gravity center of the left and right vibrators.
Figure 8A:

As shown in FIG. 7 by way of example, in a case where the difference exists in the respective drive resonance frequencies (i.e., frequencies at which amplitude ratios become peak points) of the left and right vibrators, the middle frequency of the respective drive resonance frequencies of the left and right vibrators is employed as a vibration frequency for actually driving the vibrators. This is because a frequency at which a value obtained by adding up the respective amplitude ratios of the left and right vibrators becomes the maximum is set as the vibration frequency. Here, VIIA in FIG. 7 represents an amplitude of a left vibrator, VIIB represents an amplitude of a right vibrator, VIIC represents a phase of the left vibrator, and VIID represents a phase of the right vibrator. VIIE represents a maximum amplitude ratio of the left vibrator, and VIIF represents a maximum amplitude ratio of the right vibrator. VIIG represents a drive frequency. Therefore, the vibration frequency of the left and right vibrators shifts from the respective drive resonance frequencies, and the motion images of the centers of gravity in the left and right vibrators at the vibration frequency shift relative to the positions of the maximum vibrations as indicated by circles in FIGS. 8A and 8B. FIG. 8A shows an image of movement of a gravity center of the left vibrator, and FIG. 8B shows an image of movement of a gravity center of the right vibrator.

Figure 9A:
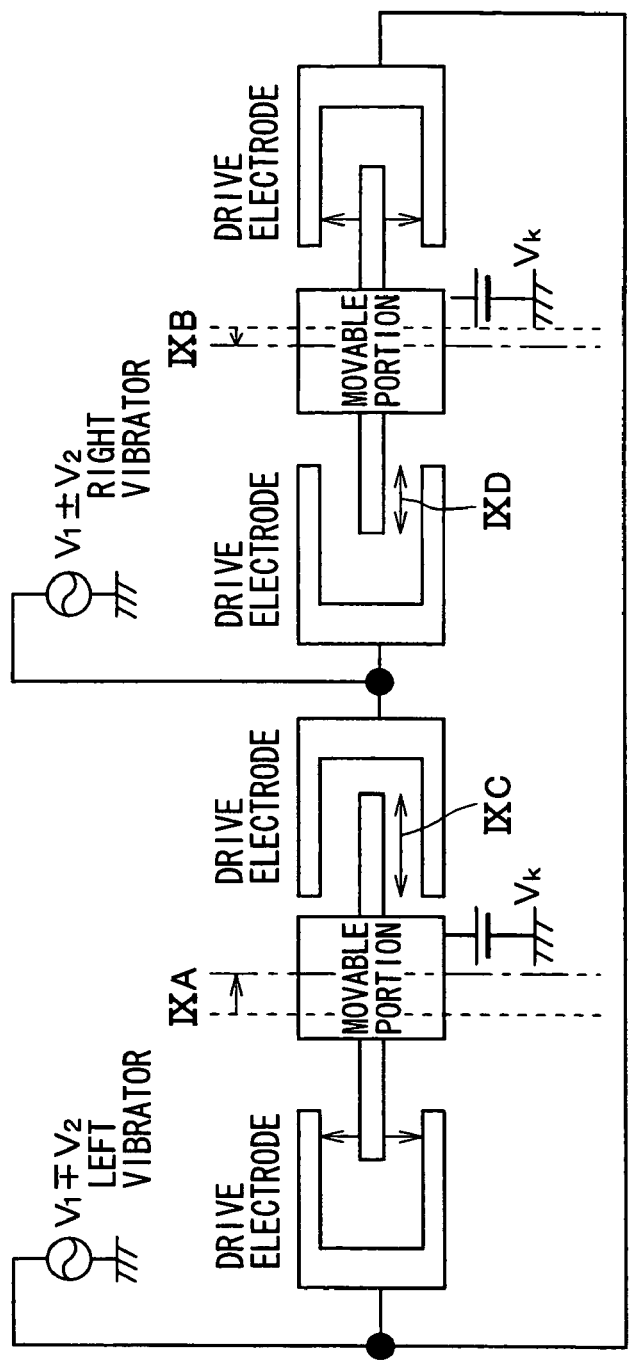
FIGS. 9A to 9C are views explaining an operation status of the sensor when a driving voltage is applied in a case where the left and right vibrators have manufacturing variation.
Figure 9C:
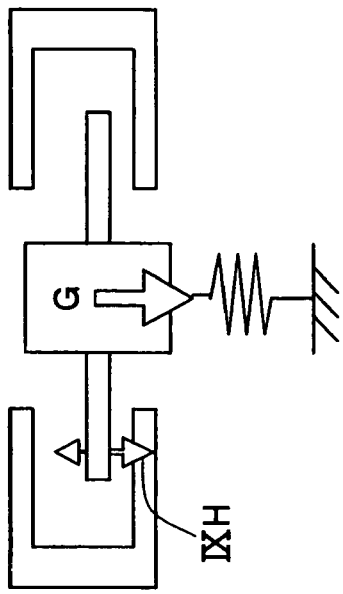

Accordingly, the satisfactory canceling effect cannot be attained as stated above, for reasons to be stated below. Operating states in the case where the product finishes of the left and right vibrators are discrepant, are shown in FIGS. 9A and 9B, and the reasons will be described in conjunction with these figures.

First, it is assumed that the state where an acceleration is not applied to the vibrators. In the case where the product finishes of the left and right vibrators are discrepant, a difference develops in the overlaps (namely, overlap magnitudes) of drive electrodes at any certain time. As shown in FIG. 9A by way of example, the left vibrator becomes larger than the right vibrator in the overlap. Incidentally, on this occasion, electrostatic forces which are generated in a vertical direction by the drive electrodes fall into balanced states. Here, in FIG. 9A, IXA represents a phase difference of a left vibrator, and IXB represents a phase difference of a right vibrator. IXC represents an overlapping between the drive electrode and the movable portion in the left vibrator, and IXD represents an overlapping between the drive electrode and the movable portion in the right vibrator. Before acceleration, the overlapping portion IXC of the left vibrator is different from the overlapping portion IXD of the right vibrator. Here, static electric force between the drive electrode and the movable portion in each vibrator is balanced.

Figure 9B:
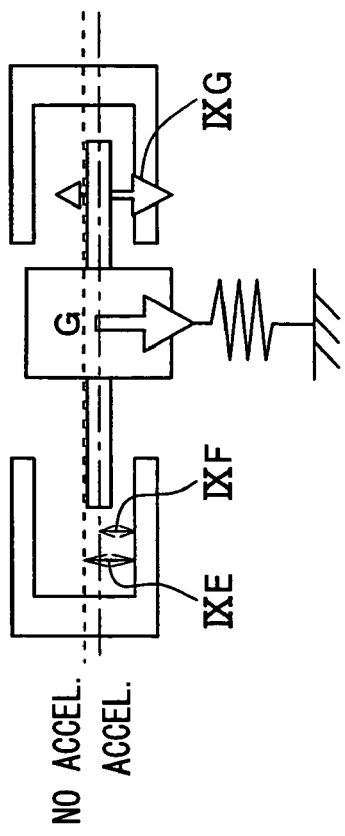

In addition, when the acceleration is applied in the detection direction of the left and right vibrators, to change the interval between the drive electrodes as shown in FIG. 9B, the vertical electrostatic forces become unbalanced. Here, IXE represents a gap between the drive electrode and the movable electrode before acceleration, and IXF represents a gap between the drive electrode and the movable electrode after acceleration. The gap IXE is changed to the gap IXF when the acceleration is applied. IXG represents an exciting force (i.e., vibration generating force) of the left vibrator, and IXH represents an exciting force of the right vibrator. The exciting force IXG of the left vibrator is different from the exciting force IXH of the right vibrator. Consequently, a difference develops in exciting forces in the detection direction of the left and right vibrators. Concretely, the exciting force which develops in each vibrator is indicated by Formula 1 given below, and its magnitude becomes different in accordance with the overlap of the drive electrodes. Incidentally, a "potential difference" in the formula signifies the potential difference between the drive electrodes, and in the prior art, voltages whose DC components are V1 and whose AC components are V2 are respectively applied between the drive electrodes in a state where the AC components are in reverse phases.

$$(\text{Exciting force}) \propto \frac{(\text{Overlap of Drive electrodes})}{(\text{Gap}) \times (\text{Potential diference})^2} \quad (F1)$$

Figure 10:
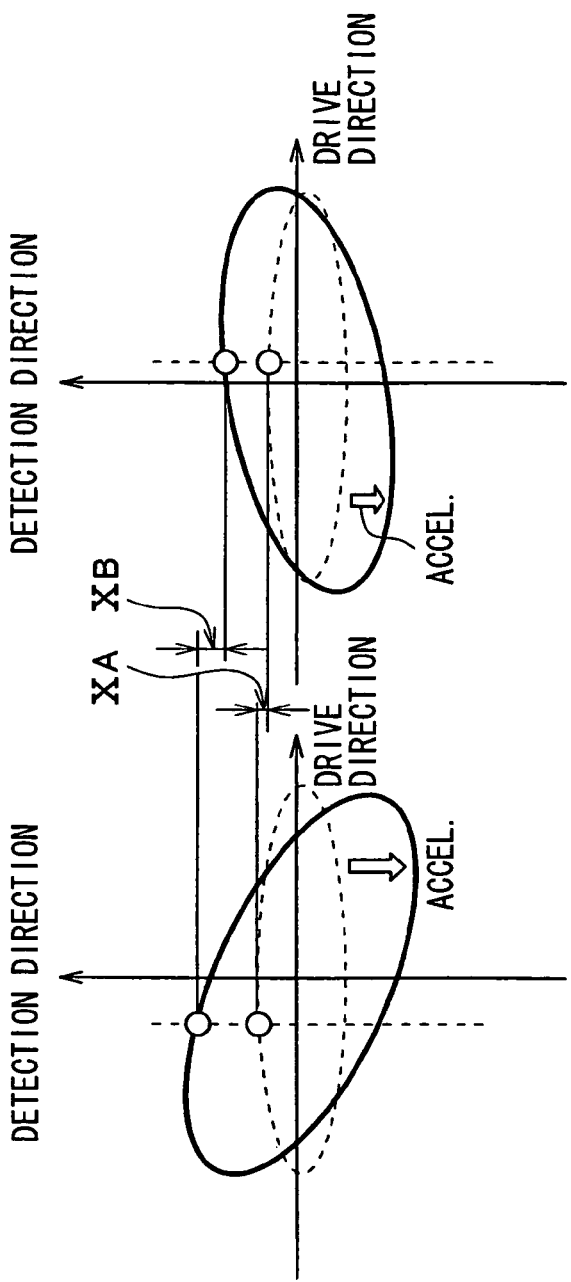
FIG. 10 is a graph showing vibration locus of left and right vibrators.

When the difference develops in the respective exciting forces of the left and right vibrators in this manner, a difference develops in the changes of the vibration loci of the left and right vibrators. By way of example, as seen from the model diagram of the vibration loci of the left and right vibrators as shown in FIG. 10, the respective vibration loci of the left and right vibrators are bilaterally symmetric when the acceleration is not applied (broken lines in the figure), whereas they become bilaterally asymmetric when the acceleration is applied (thick lines in the figure). Here, a dotted ellipsoid in a left side of FIG. 10 represents a locus of the left vibrator before acceleration, and a solid ellipsoid in the left side of FIG. 10 represents a locus of the left vibrator after acceleration. A dotted ellipsoid in a right side of FIG. 10 represents a locus of the right vibrator before acceleration, and a solid ellipsoid in the right side of FIG. 10 represents a locus of the right vibrator after acceleration. Thus, the locus of each vibrator is changed when the acceleration is applied. XA represents a differential output between the left and right vibrators when no acceleration is applied, and XB represents a differential output between the left and right vibrators when acceleration is applied. In this case, the differential output XA is changed to the differential output XB when the acceleration is applied. Therefore, the differential output of the capacitance changes of the left and right vibrators changes, the external acceleration output cannot be satisfactorily canceled, and the output ascribable to the acceleration is generated.

This is the cause for the generation of the output ascribable to the external acceleration. It is an important problem to reduce the output ascribable to the external acceleration, and a method for solving the problem is desired.

In view of the above problem, the suppression of the generation of an output, which is caused by an external acceleration on account of the product finishes of two vibrators, is provided in relation to an angular velocity sensor of capacitance type wherein an output ascribable to the external acceleration is suppressed by the differential output of the two vibrators.

Figure 1:
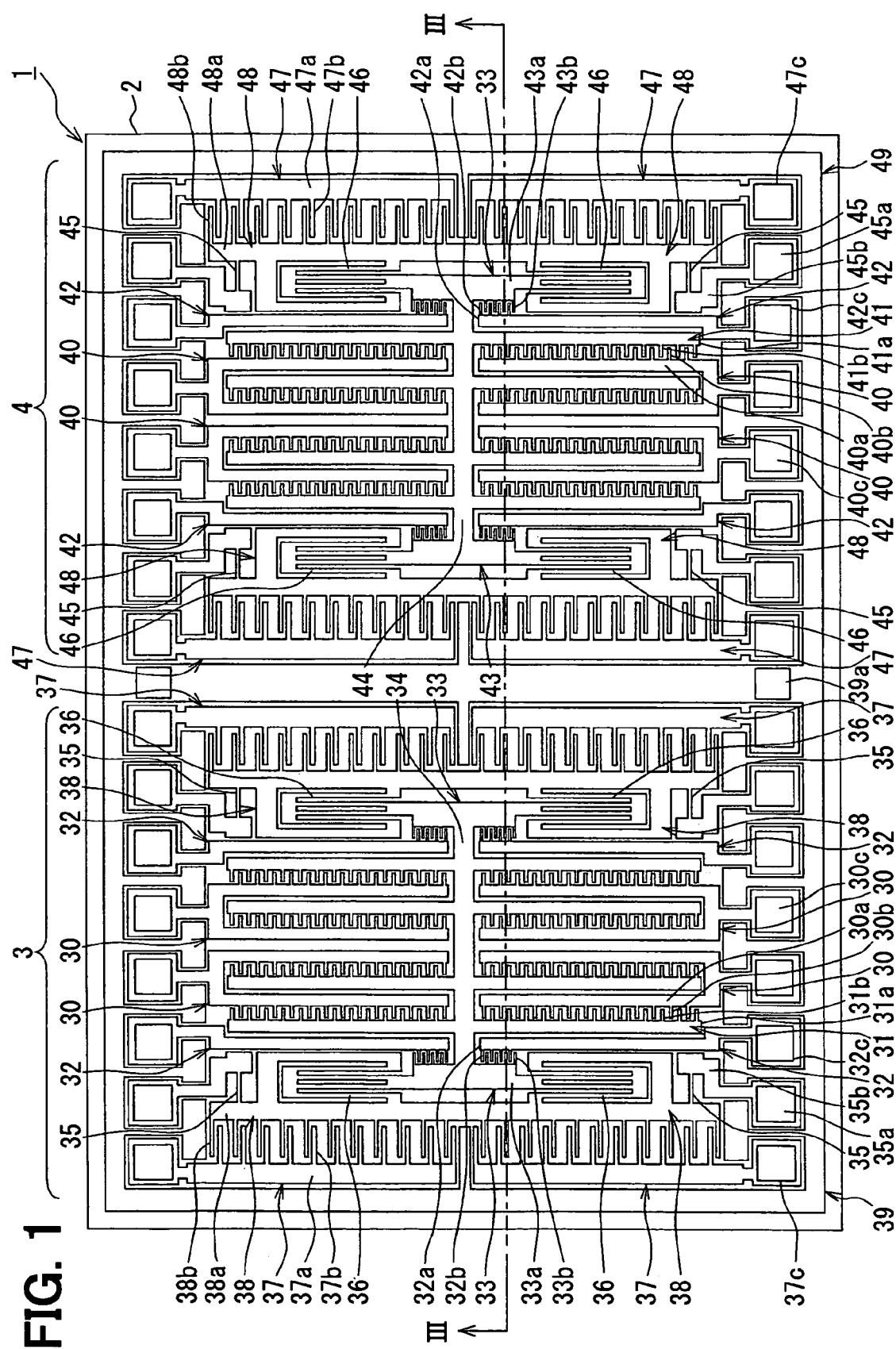
FIG. 1 is a plan view showing a gyro sensor.
Figure 2:
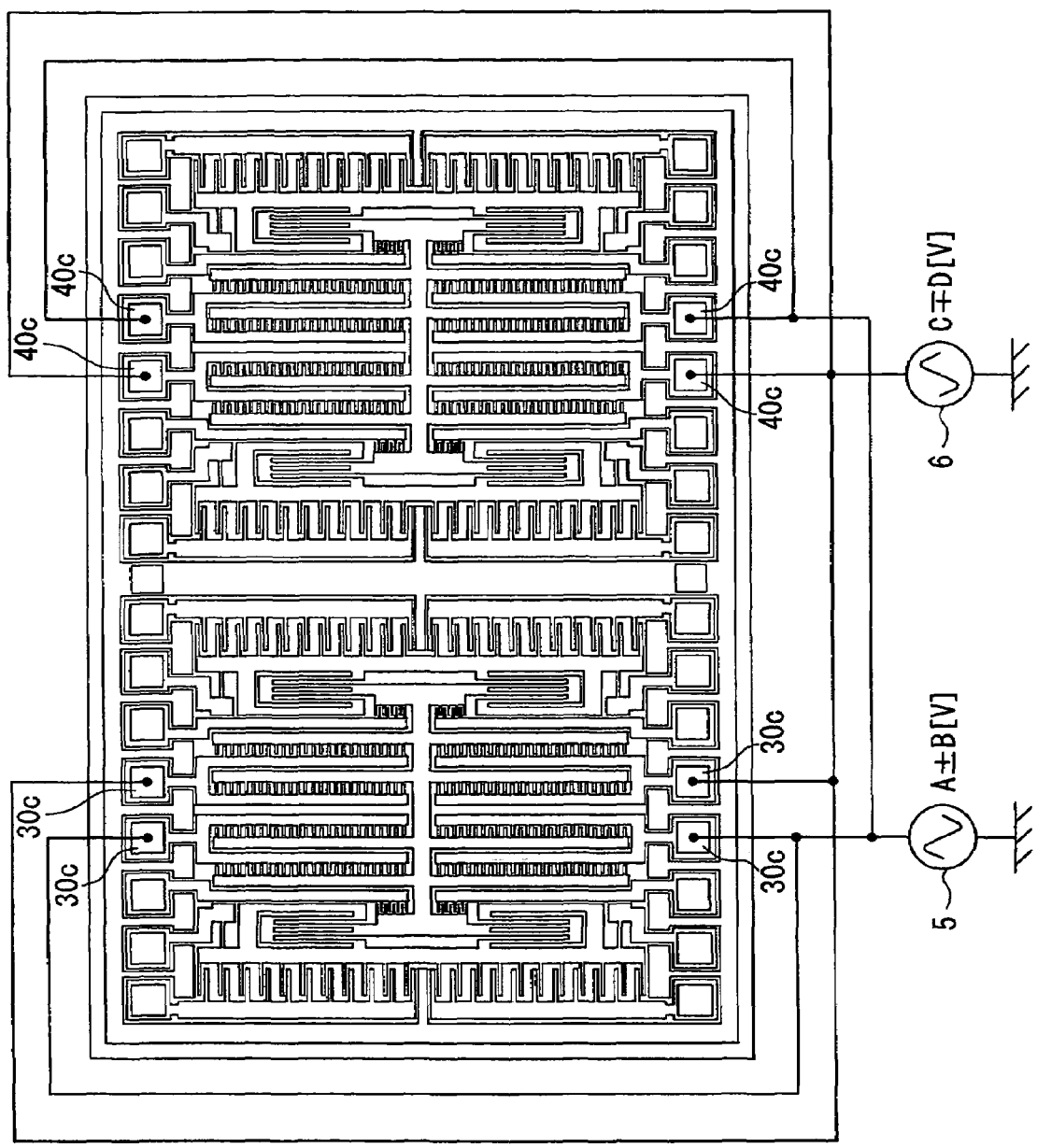
FIG. 2 is a plan view explaining an operation status of the sensor when a driving voltage is applied.
Figure 3:
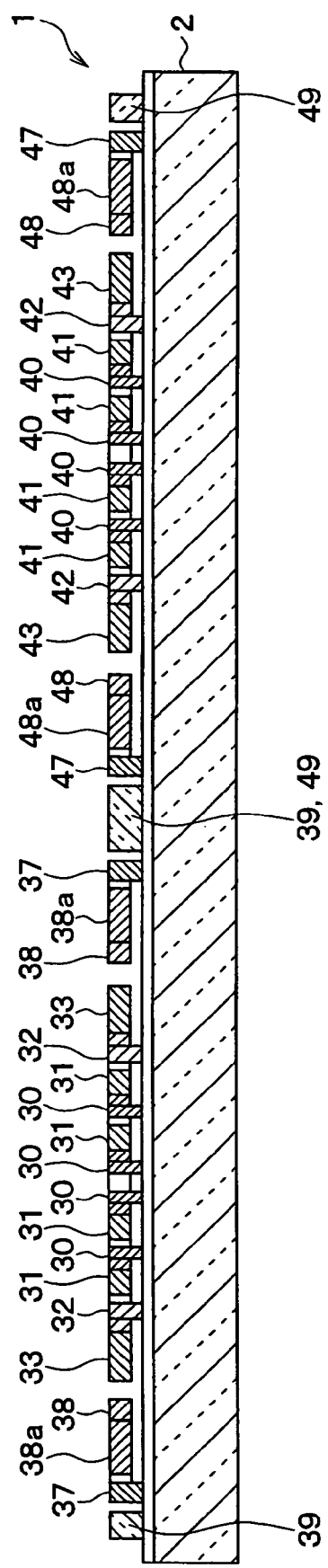
FIG. 3 is a cross sectional view showing the sensor taken along line III-III in FIG. 1.

The model diagram of an electrostatic drive/capacitance detection type micro-gyro sensor (i.e., simply termed "gyro sensor") being an angular velocity sensor of capacitance type to which one example embodiment is applied is shown in FIG. 1, and the applied states of drive voltages in the gyro sensor are shown in FIG. 2. Besides, a sectional view taken along III-III in FIG. 1 is shown in FIG. 3. Now, the gyro sensor of this embodiment will be described with reference to these figures.

As shown in FIG. 1, the gyro sensor 1 is configured including two vibrators 3 and 4 on a support substrate 2 made of a semiconductor. The vibrator on the left side of the drawing sheet in FIG. 1 is the left vibrator 3, while the vibrator on the right side of the drawing sheet is the right vibrator 4, and these vibrators 3 and 4 are configured as bilaterally symmetric structures.

The structures of the left and right vibrators 3 and 4 will be described below. Since, however, the structures of the vibrators 3 and 4 are quite the same, the structure of the left vibrator 3 will be described here, and the structure of the right vibrator 4 is omitted from description.

The left vibrator 3 includes fixed electrodes 30 and movable electrodes 31 for drive, fixed electrodes 32 and movable electrodes 33 for vibration detection, a weight portion 34, detection beams 35, drive beams 36, and fixed electrodes 37 and movable electrodes 38 for angular velocity detection, and these constituents are surrounded with a frame portion 39. Besides, the respective constituents are arranged as the bilaterally symmetric structures, which are symmetric between the left half and right half of the drawing sheet. Among these constituents, the fixed electrodes 30 for the drive, the fixed electrodes 32 for the drive vibration detection, the fixed electrodes 37 for the angular velocity detection, and the frame portion 39 correspond to a fixed portion, which is fixed to the support substrate 2. Besides, the movable electrodes 31 for the drive, the movable electrodes 33 for the vibration detection, the weight portion 34, the detection beams 35, the drive beams 36, and the movable electrodes 38 for the angular velocity detection correspond to a movable portion which can move in a direction parallel to the substrate surface of the support substrate 2.

The fixed electrodes 30 for the drive, totaling four, are disposed at substantially the central positions of the left vibrator 3 in such a manner that respectively two of them are arranged above and below. Each fixed electrode 30 has such a shape that it is supported so as to be fixed to the support substrate 2 as shown in FIG. 3, and that it is bifurcated inside the frame portion 39 as shown in FIG. 1. In addition, each of the bifurcated parts is provided with a body portion 30a and a comb-tooth portion 30b. The body portion 30a is extended toward the central part of the left vibrator 3 with its longitudinal direction being the vertical direction of the drawing sheet, while the comb-tooth portion 30b is disposed at one side surface of the body portion 30a in a state where a plurality of teeth protrude in a direction perpendicular to the longitudinal direction of the body portion 30a. Besides, each fixed electrode 30 is electrically connected to a driving pad 30c included in the frame portion 39, and it has a driving voltage applied thereto through the driving pad 30c.

The movable electrodes 31 for the drive, totaling eight, are disposed at substantially the central positions of the left vibrator 3 in such a manner that they oppose to the body portions 30a of the fixed electrodes 30 for the drive and that respectively four of them are arranged above and below. Each movable electrode 31 for the drive is held in a floating state relative to the support substrate 2 as shown in FIG. 3, and it is integral with the weight portion 34 as shown in FIG. 1. In addition, each movable electrode 31 is configured including a body portion 31a and a comb-tooth portion 31b. The body portion 31a is extended in the vertical direction of the left vibrator 3 from the weight portion 34, with its longitudinal direction being the vertical direction of the drawing sheet, while the comb-tooth portion 31b is disposed at one side surface of the body portion 31a, concretely, at a surface opposing to the comb-tooth portion 30b in the fixed electrode 30, in a state where a plurality of teeth protrude in a direction perpendicular to the longitudinal direction of the body portion 31a. Therefore, the teeth of the comb-tooth portion 31b of each movable electrode 31 and the teeth of the comb-tooth portion 30b of the corresponding fixed electrode 30 are alternately arranged with predetermined intervals therebetween.

The fixed electrodes 32 for the drive vibration detection, totaling four, are disposed at positions outside the fixed electrodes 30 and movable electrodes 31 for the drive, in such a manner that respectively two of them are arranged above and below. Each fixed electrode 32 is supported so as to be fixed to the support substrate 2 as shown in FIG. 3. In addition, each fixed electrode 32 is configured including a body portion 32a and a comb-tooth portion 32b. The body portion 32a is extended toward the central part of the left vibrator 3 with its longitudinal direction being the vertical direction of the drawing sheet, while the comb-tooth portion 32b is disposed at one side surface of the distal end part of the body portion 32a in a state where a plurality of teeth protrude in a direction perpendicular to the longitudinal direction of the body portion 32a. Besides, each fixed electrode 32 is electrically connected to a vibration detecting pad 32c included in the frame portion 39, and the potential of this fixed electrode 32 can be measured through the vibration detecting pad 32c.

The movable electrodes 33 for the drive vibration detection, totaling four, are disposed on both the sides of the weight portion 34 in such a manner that they oppose to the body portions 32a of the corresponding fixed electrodes 32 for the drive vibration detection, and that respectively two of them are arranged above and below. Each movable electrode 33 is held in a floating state relative to the support substrate 2 as shown in FIG. 3, and it is integral with the weight portion 34 as shown in FIG. 1. In addition, each movable electrode 33 is configured including a body portion 33a and a comb-tooth portion 33b. The body portion 33a is extended in the vertical direction of the left vibrator 3 from the weight portion 34, with its longitudinal direction being the vertical direction of the drawing sheet, while the comb-tooth portion 33b is disposed at one side surface of the body portion 33a, concretely, at a surface opposing to the comb-tooth portion 32b in the fixed electrode 32, in a state where a plurality of teeth protrude in a direction perpendicular to the longitudinal direction of the body portion 33a. Therefore, the teeth of the comb-tooth portion 33b of each movable electrode 33 and the teeth of the comb-tooth portion 32b of the corresponding fixed electrode 32 are alternately arranged with predetermined intervals therebetween.

The weight portion 34 is arranged among the fixed electrodes 30 for the drive. This weight portion 34 is extended with its longitudinal direction being the horizontal direction of the drawing sheet, and it is held in a floating state relative to the support substrate 2.

The detection beams 35 are arranged substantially at four corners in the left vibrator 3. Each of the detection beams 35 is made a cantilever relative to the support substrate 2, and it is supported on the support substrate 2 by a support portion 35b extended from the side of the frame portion 39. Thus, the individual elements constituting the movable portion are supported on the support substrate 2. Each detection beam 35 is electrically connected with a pad 35a for the angular velocity detection, through the support portion 35b. Predetermined voltages can be applied to the movable electrode 31 for the drive, the movable electrode 33 for the drive vibration detection, and the movable electrode 38 for the angular velocity detection, through the pad 35a for the angular velocity detection.

Each drive beam 36 serves to connect the movable electrode 33 for the vibration detection and the movable electrode 38 for the angular velocity detection, and it is configured including a plurality of beam portions whose longitudinal directions are the vertical direction of the drawing sheet. In addition, the movable electrode 33 for the vibration detection can be moved in the horizontal direction of the drawing sheet by the plurality of beam portions. Consequently, the weight portion 34 integral with the movable electrode 33 for the vibration detection and further the movable electrode 31 for the drive, integral with the weight portion 34 can be moved in the horizontal direction of the drawing sheet.

The fixed electrodes 37 for the angular velocity detection, totaling four, are disposed on both left and right sides in the left vibrator 3 in such a manner that respectively two of them are arranged above and below. Each fixed electrode 37 is supported so as to be fixed to the support substrate 2 as shown in FIG. 3. In addition, each fixed electrode 37 is configured including a body portion 37a and a comb-tooth portion 37b. The body portion 37a is extended toward the central part of the left vibrator 3 with its longitudinal direction being the vertical direction of the drawing sheet, while the comb-tooth portion 37b is disposed at one side surface of the body portion 37a in a state where a plurality of teeth protrude in a direction perpendicular to the longitudinal direction of the body portion 37a. Besides, each fixed electrode 37 is electrically connected to an angular velocity detecting pad 37c included in the frame portion 39, and the potential of the fixed electrode 37 for the angular velocity detection can be measured through the angular velocity detecting pad 37c.

The movable electrodes 38 for the angular velocity detection, totaling two, are disposed on both the sides of the weight portion 34 in such a manner that they oppose to the corresponding fixed electrodes 37 for the angular velocity detection, and that one of them is arranged on each corresponding side. Each movable electrode 38 is held in a floating state relative to the support substrate 2 as shown in FIG. 3, and it is integral with the weight portion 34, the drive beam 36, etc. as shown in FIG. 1. In addition, each movable electrode 38 is configured including a body portion 38a and a comb-tooth portion 38b. The body portion 38a is extended so as to lead from an upper side position to a lower side position in the frame portion 39, with its longitudinal direction being the vertical direction of the drawing sheet, while the comb-tooth portion 38b is disposed at one side surface of the body portion 38a, concretely, at a surface opposing to the comb-tooth portion 37b in the fixed electrode 37, in a state where a plurality of teeth protrude in a direction perpendicular to the longitudinal direction of the body portion 38a. Therefore, the teeth of the comb-tooth portion 38b of each movable electrode 38 and the teeth of the comb-tooth portion 37b of the corresponding fixed electrode 37 are alternately arranged with predetermined intervals therebetween.

The frame portion 39 is configured so as to surround the left and right vibrators 3 and 4, and it is fixed to the support substrate 2 as shown in FIG. 3. This frame portion 39 is held at a fixed potential through pads 39a. Owing to such an arrangement, the gyro sensor 1 of this embodiment is configured.

Incidentally, the right vibrator 4 has quite the same configuration as that of the left vibrator 3, and the respective constituents are in corresponding relations stated below. The fixed electrodes 30 and movable electrodes 31 for the drive correspond to fixed electrodes 40 and movable electrodes 41. The fixed electrodes 32 and movable electrodes 33 for the vibration detection correspond to fixed electrodes 42 and movable electrodes 43. The weight portion 34 corresponds to a weight portion 44, and the detection beams 35 correspond to detection beams 45. The drive beams 36 correspond to drive beams 46, and the movable electrodes 37 and fixed electrodes 38 for the angular velocity detection correspond to movable electrodes 47 and fixed electrodes 48. In addition, the frame portion 39 corresponds to a frame portion 49. Besides, the detailed configurations of body portions 40a as well as comb-tooth portions 40b, etc. which constitute the individual portions of the right vibrator 4, are indicated by altering reference numerals 30s assigned to the left vibrator 3, into 40s in the figures.

Next, there will be described a sensor circuit which is employed for driving the gyro sensor 1 of this embodiment and for detecting the change of the detection capacitance of the gyro sensor 1. The block arrangement of the sensor circuit 110 is shown in FIG. 4, which will now be referred to.

Figure 4:
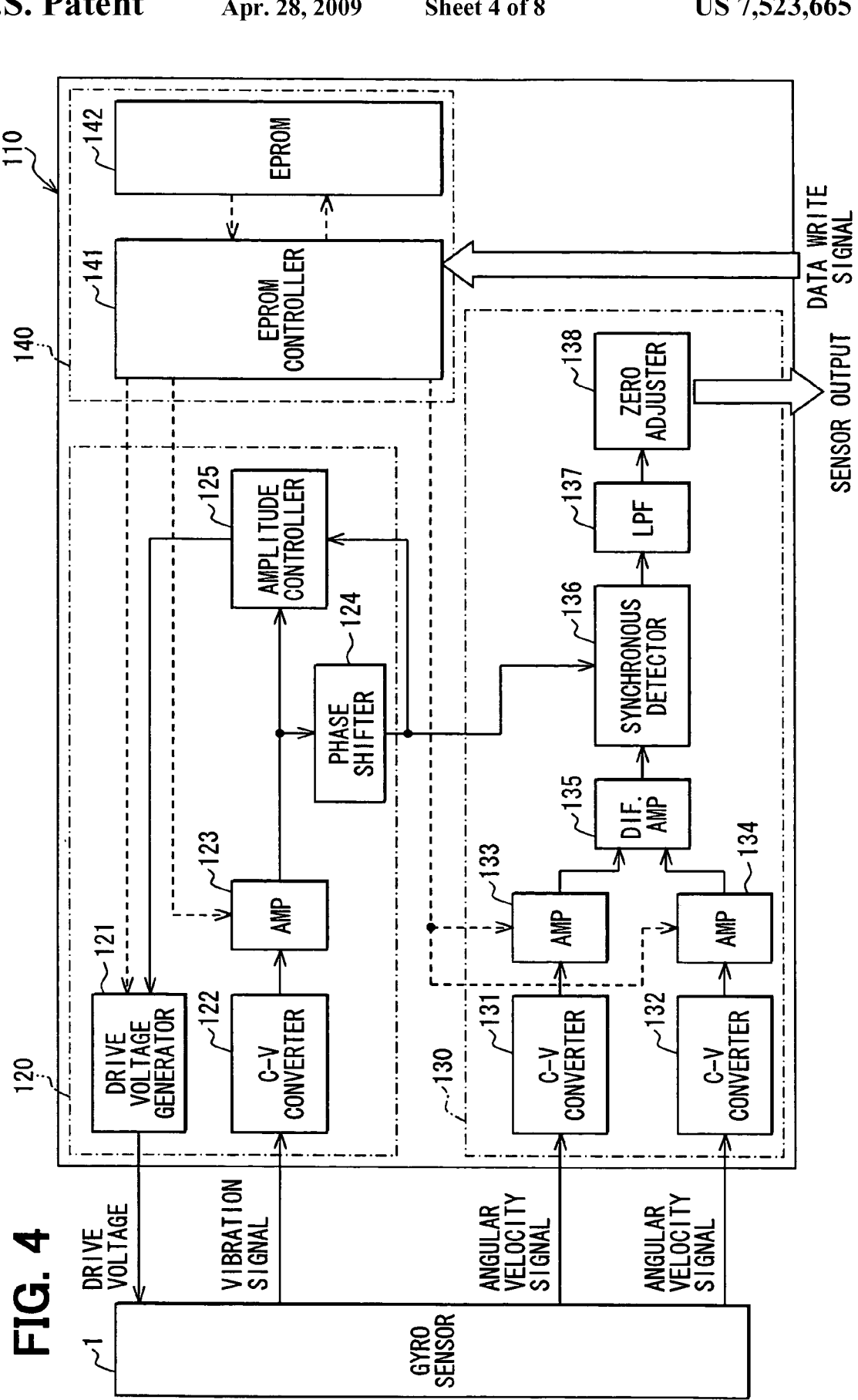
FIG. 4 is a block diagram showing a sensor circuit in the sensor.

As shown in FIG. 4, the sensor circuit 110 is configured including a drive circuit 120 and an angular velocity sensing circuit 130.

The drive circuit 120 serves to vibrate the movable electrodes 31 and 41 for the drive, in the respective vibrators 3 and 4 included in the gyro sensor 1. This drive circuit 120 includes a drive voltage generation circuit 121 including a sensor drive power source, a C-V conversion circuit 122, an amplification circuit 123, a phase shifter 124 and a constant amplitude control portion 125.

The drive voltage generation circuit 121 forms a voltage for vibrating the movable electrodes 31 and 41 for the drive, in the gyro sensor 1 by boosting a voltage from the sensor drive power source. In order to drive the movable electrodes 31 and 41 for the drive, at a predetermined amplitude and a predetermined frequency, the drive voltage generation circuit 121 boosts the voltage generated by the sensor drive power source and outputs the voltage of the predetermined frequency to the movable electrodes 31 and 41 for the drive, as the drive voltage. Concretely, the drive voltage to be generated by the drive voltage generation circuit 121 is adjusted on the basis of the drive voltage which is fed back through the C-V conversion circuit 122 and the amplification circuit 123, and a signal which is fed from the constant amplitude control portion 125.

The C-V conversion circuit 122 accepts from the gyro sensor 1, a sense signal which corresponds to the drive vibrations of the movable electrodes 31 and 41 for the drive, in the gyro sensor 1 (hereinbelow, termed the "drive vibration sense signal"), and it subjects the drive vibration sense signal to a voltage conversion.

The amplification circuit 123 amplifies the drive vibration sense signal subjected to the voltage conversion by the C-V conversion circuit 122, at a predetermined gain. The drive vibration sense signal amplified by the amplification circuit 123 is inputted to the constant amplitude control portion 125 and the phase shifter 124.

The phase shifter 124 serves to adjust the phase of the drive voltage. As stated above, the drive voltage is formed by the drive voltage generation circuit 121 on the basis of the fed-back drive vibration sense signal, so that the phase of the drive vibration sense signal shifts from the phase of the drive voltage which is actually to be outputted to the movable electrodes 31 and 41 for the drive. In order to restore the shift of the phase, the phase of the drive vibration sense signal must be adjusted into agreement with the phase of the drive voltage. For this purpose, the phase of the drive vibration sense signal is corrected by the phase shifter 124, with the result that the phase of the drive voltage which is formed on the basis of the drive vibration sense signal is adjusted. Thus, the frequency of the drive voltage is set at fd.

The constant amplitude control portion 125 senses the present amplitude of the movable electrodes 31 and 41 for the drive, from the drive vibration sense signal, and it outputs a signal for correcting the amplitude so as to become constant, to the drive voltage generation circuit 121.

Besides, the angular velocity sensing circuit 130 serves to obtain a sensor output on the basis of the detection signals of the gyro sensor 1. The angular velocity sensing circuit 130 includes two C-V conversion circuits 131 and 132, two amplification circuits 133 and 134, a differential amplification circuit 135, a synchronous detection circuit 136, an LPF 137 and a zero-point/sensitivity temperature characteristic adjustment circuit 138.

The two C-V conversion circuits 131 and 132 accept from the pair of vibrators 3 and 4, sense signals which correspond to vibrations generated when angular velocities have acted on the movable electrodes 38 and 48 for the angular velocity detection (hereinbelow, termed the "angular velocity sense signals"), respectively, and they subject the angular velocity sense signals to voltage conversions.

The amplification circuits 133 and 134 amplify the angular velocity sense signals subjected to the voltage conversions by the respective C-V conversion circuits 131 and 132, at a predetermined gain. The angular velocity sense signals having been amplified by the respective amplification circuits 133 and 134 are inputted to the differential amplification circuit 135.

The differential amplification circuit 135 corresponds to differential amplification means for generating the differential output of the angular velocity sense signals amplified by the respective amplification circuits 133 and 134. The differential output of the differential amplification circuit 135 is inputted to the synchronous detection circuit 136. This differential output of the differential amplification circuit 135 becomes an AC signal which contains a predetermined offset voltage being a DC component.

The synchronous detection circuit 136 passes a component synchronous with the frequency fd, from within the differential output of the differential amplification circuit 135, on the basis of the phase adjusted by the phase shifter 124, so as to output the synchronous component to the LPF 137.

The LPF 137 extracts only a component of and below a predetermined frequency, within the signal having passed through the synchronous detection circuit 136. Since the LPF 137 is caused to pass the signal, a time delay corresponding to the filter constant of the LPF 137 develops.

Since an output offset and the temperature characteristic of sensitivity are involved even in the signal having passed through the LPF 137, the zero-point/sensitivity temperature characteristic adjustment circuit 138 adjusts the output offset and the temperature characteristic. The signal having been adjusted by the zero-point/sensitivity temperature characteristic adjustment circuit 138 is basically employed as the sensor output.

Further, a data processing circuit 140 is included in the sensor circuit 110. The data processing circuit 140 includes an EPROM control circuit 141 and an EPROM 142.

The EPROM control circuit 141 is connected to trim terminals (pads) for connecting a chip in which the sensor circuit 110 is formed, and the exterior. This EPROM control circuit 141 receives a signal for writing data from the exterior, and reads out data from the EPROM 142. Further, it executes the adjustment of the drive voltage to be outputted from the drive voltage generation circuit 121, the adjustments of the gains of the amplification circuits 123, 133 and 134, etc. on the basis of the read-out data. This EPROM control circuit 141 corresponds to a storage portion control circuit. Incidentally, the trim terminals are covered with a package (not shown) for bonding and encapsulating the sensor circuit 110, and they are connected with the external terminals of the package by wire bonding. Therefore, the electrical connections of the sensor circuit 110 with the exterior can be attained through the external terminals.

The EPROM 142 corresponds to a storage portion, and it stores therein the data for adjusting the drive voltage to be outputted from the drive voltage generation circuit 121, and the data for adjusting the gains of the amplification circuits 123, 133 and 134. Here, the "data for adjusting the drive voltage to be outputted from the drive voltage generation circuit 121" signify addresses indicating information on voltages which can mitigate the influence of an acceleration as the drive voltage to be outputted from the drive voltage generation circuit 121, and the addresses are stored in the EPROM 142. In addition, the EPROM control circuit 141 adjusts the drive voltage to be outputted from the drive voltage generation circuit 121, on the basis of the addresses stored in the EPROM 142, whereby the influence of the acceleration is mitigated.

Next, there will be described that step of adjusting a drive voltage which is performed as one step of a manufacturing process for the gyro sensor 1 of this embodiment. Incidentally, the gain adjustments of the amplification circuits 123, 133 and 134 included in the drive circuit 120 and the angular velocity sensing circuit 130 are performed as a preparation for the adjustment of the drive voltage beforehand, and the adjustment of the drive voltage is thereafter performed.

First, it is necessary to create an ordinary situation where an angular velocity can be sensed. For this purpose, the drive voltage is generated by the drive voltage generation circuit 121. On this occasion, as the drive voltage, signals whose magnitudes are equal and whose phases are reverse to each other are employed for the left and right vibrators 3 and 4 in the same manner as in the prior art.

Concretely, desired drive voltages are applied to the driving pads 30c to which the fixed electrodes 30 for the drive are electrically connected, whereby the gyro sensor 1 of this embodiment is driven. More specifically, as shown in FIG. 2, a first voltage (A±B) [V] is applied from a first power source 5 to two fixed electrodes 30 which are among the four fixed electrodes 30 for the drive, in the left vibrator 3, and which are located on the left half side of the drawing sheet, and two fixed electrodes 40 which are among the four fixed electrodes 40 for the drive, in the right vibrator 4, and which are located on the right half side of the drawing sheet. Besides, a second voltage (C±D) [V] is applied from a second power source 6 to two fixed electrodes 30 which are among the four fixed electrodes 30 for the drive, in the left vibrator 3, and which are located on the right half side of the drawing sheet, and two fixed electrodes 40 which are among the four fixed electrodes 40 for the drive, in the right vibrator 4, and which are located on the left half side of the drawing sheet.

Here, the "first voltage (A±B) [V]" and the "second voltage (C±D) [V]" signify voltage values obtained in such a way that voltages B and D which are cyclically changing AC components are added to or subtracted from constant voltages A and C which are DC components. However, the sign ± of the voltage B being the AC component and the sign ± of the voltage D being the AC component are in a reciprocal relationship, and the first and second voltages become voltages whose cycles shift 180 degrees and whose phases are reverse to each other.

In this state, an acceleration is imparted in the acting direction of the Coriolis forces of the left and right vibrators 3 and 4 (a direction perpendicular to a drive vibration axis). Techniques for imparting the acceleration include a method which uses an exciter or the like, a method which utilizes a gravitational acceleration, and so on. In this regard, when the method utilizing the gravitational acceleration is adopted, preferably any device for imparting the acceleration need not be disposed, and the constant acceleration can be always imparted.

Subsequently, when angular velocity sense signals are outputted from the gyro sensor 1 so as to deliver a sensor output from the angular velocity sensing circuit 130, the sensor output is monitored. In addition, while the sensor output is being monitored, the drive voltage to be applied to the left vibrator 3 and the drive voltage to be applied to the right vibrator 4 are changed. Besides, the drive voltages which minimize the sensor output are detected. By way of example, either or both of the constant voltages A, C being the DC components and the voltages B, D being the AC components in the drive voltages (first and second voltages) can be changed, but the case of changing the constant voltages A, C will be described in this embodiment.

Here, how to change the drive voltages will be described. In the case where the drive voltages (first and second voltages) are changed for adjustments, the range of changeable voltages is determined beforehand. By way of example, in the case of changing the constant voltages A, C which are the DC components in the drive voltages, the adjustable voltage range is 1 through 9 V. In a case where the drive voltages of the gyro sensor 1 have a center value of 5 V, the constant voltage A, for example, can be set from 5V to 9V (i.e., 5+4 V) or from 5V to 1V (i.e., 5–4 V) for the adjustment.

Therefore, regarding at least one of the first voltage and the second voltage, the constant voltage A or the constant voltage C is changed from 5V to 9V or from 5V to 1V. On this occasion, the drive voltage can be adjusted by changing only the constant voltage A or only the constant voltage C. More preferably, likewise to the constant voltage A, the constant voltage C may be changed reversely to the constant voltage A. That is, when the constant voltage A is increased relative to the center value, the constant voltage C may be changed so as to decrease relative to the center value. By way of example, when the constant voltage A has been changed from 5V to 9V, the constant voltage C is changed from 5V to 1V. In this way, an adjustment effect can be doubled, and hence, the adjustment effect can be enhanced more than in the change of only the constant voltage A.

Figure 5:
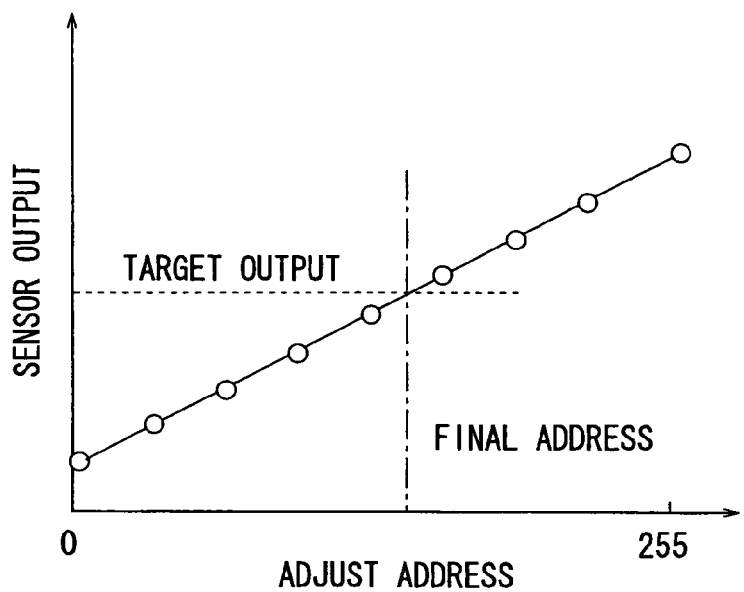
FIG. 5 is a graph showing a relationship between a sensor output and an adjustment address.

Accordingly, the whole adjustment address of the EPROM 142 is divided at equal intervals, and the individual divisional addresses are associated with the change magnitudes of the constant voltages A and C from the center value. In addition, the constant voltages A and C are changed from the center value in the order of the addresses, and sensor outputs at the respective divisional addresses are measured. In a case, for example, where the adjustment addresses of the EPROM 142 have 10 bits (from the 0th address to the 255th address), the whole address is divided into 8 points or so, and the sensor outputs are measured at the addresses of the 8 points. As a result, an adjustment address—sensor output characteristic as shown in FIG. 5 is obtained. In FIG. 5, a target output represents an aim value of sensor zero-point output, i.e., a target value of zero-point output. A final address represents a final adjustment address; and therefore, the final address is a determined value. Incidentally, since the adjustment address—sensor output characteristic has been known to become a substantially rectilinear relationship by experiments, etc., the sensor outputs change in conformity with the adjustment address order.

Subsequently, the address at which a zero-point output becomes an aim value is calculated from the graph. More specifically, as shown in FIG. 5, an address nearest to the intersection point between the aim value of a sensor zero-point output at which the sensor output becomes zero and a straight line which represents the adjustment address—sensor output characteristic becomes the address at which the sensor output becomes nearest to zero even at the occurrence of the acceleration. This address is therefore written into and stored in the EPROM 142.

Thus, when the address is read out from the address stored in the EPROM 142 by the EPROM control circuit 141, the change magnitudes of the constant voltages A and C from the center value as can minimize the sensor output ascribable to the influence of the acceleration, at the application of the acceleration to the gyro sensor 1.

By the way, when the change magnitudes are equalized in the case of adjusting both the constant voltages A and C as indicated here, one address suffices for storing the change magnitudes in the EPROM 142, and hence, the storage capacity of the EPROM 142 can be made small.

Next, a drive method for the gyro sensor 1 of this embodiment will be described.

The gyro sensor 1 of this embodiment is driven by applying desired drive voltages to the driving pad 30c, to which the fixed electrode 30 for the drive are electrically connected.

Concretely, as shown in FIG. 2, the first voltage (A±B) [V] is applied from the first power source 5 to the two fixed electrodes 30 which are among the four fixed electrodes 30 for the drive, in the left vibrator 3, and which are located on the left half side of the drawing sheet, and the two fixed electrodes 40 which are among the four fixed electrodes 40 for the drive, in the right vibrator 4, and which are located on the right half side of the drawing sheet. Besides, the second voltage (C±D) [V] is applied from the second power source 6 to the two fixed electrodes 30 which are among the four fixed electrodes 30 for the drive, in the left vibrator 3, and which are located on the right half side of the drawing sheet, and the two fixed electrodes 40 which are among the four fixed electrodes 40 for the drive, in the right vibrator 4, and which are located on the left half side of the drawing sheet.

On this occasion, the constant voltages A and D which are the DC components in the first and second voltages are set at values in which the change magnitudes from the center value as can mitigate the influence of the acceleration as stated before are considered, for the reason that the EPROM control circuit 141 reads out the address stored in the EPROM 142 so as to transmit this address to the drive voltage generation circuit 121.

When such drive voltages are applied to the driving pads 30c, 40c, electrostatic attractive forces based on capacitances which are formed between the fixed electrodes 30, 40 and movable electrodes 31, 41 for the drive are generated with the cyclic fluctuations of the AC components of the drive voltages. Thus, the drive beams 37, 47 are flexed, and the movable electrodes 31, 41 for the drive, etc. are vibrated in the leftward direction or rightward direction of the drawing sheet together with the weight portions 34, 44. In addition, as the AC components of the drive voltages change cyclically, the movable electrodes 31, 41 for the drive, etc. are cyclically vibrated in the horizontal direction of the drawing sheet together with the weight portions 34, 44. Since the AC components of the drive voltages are in reverse phases to each other, the left and right vibrators are vibrated in directions reverse to each other.

On this occasion, the overlap magnitudes between the comb-tooth portions 32b, 42b in the fixed electrodes 32, 42 for the vibration detection and the comb-tooth portions 33b, 43b in the movable electrodes 33, 43 fluctuate in correspondence with the cyclic vibrations, so that capacitances which are formed by these comb-tooth portions change. The capacitance changes are measured from the potentials of those pads 32c, 42c for the vibration detection to which the fixed electrodes 32, 42 are connected, whereby the magnitudes of the cyclic vibrations can be monitored. Therefore, the drive voltages are feedback-controlled in accordance with the magnitudes of the cyclic vibrations in order that the magnitudes of the cyclic vibrations may become desired values.

When an acceleration is inputted in this state, Coriolis forces are generated, and the weight portions 34, 44 and the movable portions 38, 48 for the angular velocity detection, etc. are vibrated in the vertical direction of the drawing sheet by the flexes of the detection beams 35, 45.

Thus, the intervals between the comb-tooth portions 38b, 48b included in the movable electrodes 38, 48 for the angular velocity detection and the comb-tooth portions 37b, 47b included in the fixed electrodes 37, 47 for the angular velocity detection change, and capacitances which are formed by these comb-tooth portions change. Since the potentials of the fixed electrodes 37, 47 for the angular velocity detection change with the capacitance changes, an angular velocity can be detected by measuring the potentials.

Next, an advantage based on the gyro sensor 1 of this embodiment will be described.

In this embodiment, as stated before, A±B [V] is adopted as the first voltage, and C±D [V] as the second voltage, and the values which minimize a sensor output at the application of an acceleration are adopted as regards the constant voltages A and C which are the DC components of the first and second voltages.

Therefore, even when the acceleration has been applied at the detection of an angular velocity, influence ascribable to the acceleration can be mitigated to the utmost. This will be elucidated with reference to FIGS. 6A and 6B.

FIGS. 6A and 6B show the model diagrams of the vibration loci of the left and right vibrators 3 and 4. Here, FIG. 6A shows the vibration loci in the case where both the constant voltages A and C being the DC components of the first and second voltages are set at the center value (for example, 5 V), while FIG. 6B shows the vibration loci in the case where the first and second voltages are set as in this embodiment. Further, a left side of FIG. 6A shows a locus of the left vibrator 3 before adjustment, and a right side of FIG. 6A shows a locus of the right vibrator 4 before adjustment. A left side of FIG. 6B shows a locus of the left vibrator 3 after adjustment, and a right side of FIG. 6B shows a locus of the right vibrator 4 after adjustment. Dotted ellipsoids in FIGS. 6A and 6B represent loci when no acceleration is applied, and solid ellipsoids represent loci when acceleration is applied. In FIG. 6B, dashed-dotted ellipsoids represent loci when the acceleration is applied in a case the adjustment is not performed. VIA represents a differential output between the left and right vibrators 3, 4 before adjustment when no acceleration is applied, and VIB represents a differential output between the left and right vibrators 3, 4 before adjustment when acceleration is applied. In this case, when the acceleration is applied, the loci of the left and right vibrators 3, 4 are changed, respectively. Further, the differential output is changed from VIA to VIB before adjustment. VIC represents a differential output between the left and right vibrators 3, 4 after adjustment when no acceleration is applied, and VID represents a differential output between the left and right vibrators 3, 4 after adjustment when acceleration is applied. In this case, when the acceleration is applied, the loci of the left and right vibrators 3, 4 are changed, respectively. Further, after adjustment, the differential output of VIC when no acceleration is applied is balanced to the differential output of VID when the acceleration is applied, i.e., a displacement VIE of the left vibrator 3 is balance to a displacement VIF of the right vibrator 4.

Specifically, when a state where the acceleration is not applied in the detection direction of the vibrators has changed into a state where the acceleration is applied, the displacement magnitudes of the left and right vibrators 3 and 4 come into agreement as shown in FIG. 6B.

The reason therefore is that the displacement magnitudes of the movable portions (such as the weight portions 34, 44 and the individual movable electrodes) in the vertical direction of the drawing sheet at the application of the acceleration can be brought into agreement by adjusting exciting forces in a detection direction, namely, the vertical direction of the drawing sheet at any certain time.

That is, as stated before, each of the exciting forces in the vertical direction of the drawing sheet as are generated in the respective vibrators 3 and 4 is represented by the following formula:

$$\text{(Exciting force)} \propto \frac{\text{(Overlap of Drive electrodes)}}{\text{(Gap)} \times \text{(Potential diference)}^2} \quad \text{(F2)}$$

In addition, the overlap and the gap in the fixed electrodes 30 and movable electrodes 31 for the drive, corresponding to the drive electrodes, are ascribable to the discrepancy of the product finishes of the left and right vibrators 3 and 4. Therefore, a potential difference which becomes a third parameter for determining the exciting forces, that is, the potential difference between the fixed electrodes 30 and the movable electrodes 31 is adjusted, whereby the exciting forces can be balanced so that the displacement magnitudes of the left and right vibrators 3 and 4 may come into agreement.

Accordingly, when the acceleration has been applied, the displacement magnitudes of the left and right vibrators 3 and 4 come into agreement with those before the application of the acceleration, and the fluctuation of the differential output of the capacitance changes of the left and right vibrators 3 and 4 becomes null. Consequently, it is permitted to satisfactorily cancel an external acceleration output, and the output ascribable to the acceleration can be suppressed to become as small as possible.

As described above, according to the gyro sensor 1 of this embodiment, the external acceleration output can be satisfactorily canceled, and the output ascribable to the acceleration can be suppressed to become as small as possible. Thus, it is permitted to enhance a sensor precision.

The foregoing embodiment has been described as to the case where only the constant voltages A and C being the DC components in the first and second voltages are changed as the drive voltages, but the voltages B and D being the AC components can also be changed. That is, an adjustment can be made by changing at least one of the voltages B and D which are the AC components. On this occasion, in addition to the voltage B (or D), the voltage D (or B) should preferably be changed reversely to the voltage B (or D). In this way, an adjustment effect can be doubled, so that the adjustment effect can be enhanced more than by changing the only the voltage B (or the voltage D), and an adjustable range can be widened. Besides, although the case where the drive voltage is a sinusoidal wave has been indicated in the foregoing embodiment, the drive voltage may well be a rectangular wave. In that case, a technique in which the duty ratio of the rectangular wave is changed can also be employed.

It is, of course, possible to combine all or two of the technique of changing the constant voltages A and C, the technique of changing the voltages B and D, and the technique of changing the duty ratio of the rectangular wave. In the case of the combination, adjustment magnitudes are larger in the order of (1) the technique of changing the constant voltages A and C, (2) the technique of changing the voltages B and D, and (3) the technique of changing the duty ratio of the rectangular wave, and hence, rough adjustments and fine adjustments can be made in conformity with the order. In a case, for example, where the techniques (1) and (2) are combined, the rough adjustments are first made by the adjustments based on the technique (1), and the fine adjustments are subsequently made by the adjustments based on the technique (2). Then, the adjustments are quick, and they are less susceptible to the influence ascribable to the acceleration.

The structure of the gyro sensor 1 illustrated in the foregoing embodiment is a mere example, and the invention may well be applied to other structures which have been generally known. Besides, in FIG. 1, the numbers of teeth included in each fixed electrode and each movable electrode are schematic, and it is needless to say that the exemplary numbers are not restrictive.

The above disclosure has the following aspects.

According to a first aspect of the present disclosure, an angular velocity sensor includes: a support substrate; and first and second vibrators disposed on the support substrate. Each vibrator includes a movable portion and a fixed portion. The movable portion of each vibrator has a driving purpose movable electrode and a detecting purpose movable electrode. The movable portion is movably supported on the support substrate so that the movable portion is movable in a horizontal direction parallel to a surface of the support substrate. The fixed portion of each vibrator has a driving purpose fixed electrode and a detecting purpose fixed electrode. The fixed portion is fixed on the support substrate. The driving purpose fixed electrode faces the driving purpose movable electrode, and the detecting purpose fixed electrode faces the detecting purpose movable electrode. The first vibrator has a predetermined construction, which is symmetric to a construction of the second vibrator. The movable portion of each vibrator has a part capable of vibrating in a vibration direction parallel to the horizontal direction by applying a driving voltage between the driving purpose fixed electrode and the driving purpose movable electrode. The part of movable portion of each vibrator is capable of oscillating in an oscillation direction perpendicular to the vibration direction by a Coriolis force, which is generated by an angular velocity applied to the part of the movable portion. A capacitance between the detecting purpose fixed electrode and the detecting purpose movable electrode is changeable in accordance with an oscillation of the part of the movable portion. The angular velocity is detected based on a capacitance change between the detecting purpose fixed electrode and the detecting purpose movable electrode. The driving purpose fixed electrode in the first vibrator includes a first side driving purpose fixed electrode and a second side driving purpose fixed electrode. The driving purpose fixed electrode in the second vibrator includes a first side driving purpose fixed electrode and a second side driving purpose fixed electrode. The driving voltage applied to the first side driving purpose fixed electrode in the first vibrator is defined as a first driving voltage, and the driving voltage applied to the second side driving purpose fixed electrode in the second vibrator is the first driving voltage. The first driving voltage includes a direct voltage defined as A volts and an alternating voltage defined as B volts so that the first driving voltage is described as A+B volts. The driving voltage applied to the second side driving purpose fixed electrode in the first vibrator is defined as a second driving voltage, and the driving voltage applied to the first side driving purpose fixed electrode in the second vibrator is the second driving voltage. The second driving voltage includes a direct voltage defined as C volts and an alternating voltage defined as D volts so that the second driving voltage is described as C+D volts. The alternating voltage of the first driving voltage has a predetermined phase, which is opposite to a phase of the alternating voltage of the second driving voltage. At least one of the direct voltages in the first and second driving voltages is controlled in such a manner that the first vibrator vibrates the movable portion with a predetermined phase, which is opposite to a phase of the movable portion in the second vibrator, at least one of the alternating voltages in the first and second driving voltages is controlled in such a manner that the first vibrator vibrates the movable portion with a predetermined phase, which is opposite to a phase of the movable portion in the second vibrator, or at least one of duty ratios of the first and second driving voltages that are set to be a rectangular wave is controlled with reference to a center value of the duty ratios of the rectangular waves in such a manner that the first vibrator vibrates the movable portion with a predetermined phase, which is opposite to a phase of the movable portion in the second vibrator.

In the above sensor, the output caused by an external acceleration is sufficiently cancelled, so that the output attributed to the acceleration is minimized.

Alternatively, the one of the direct voltages in the first and second driving voltages may be controlled in such a manner that the direct voltage of the first driving voltage is changed from a center value between the direct voltages of the first and second driving voltages by a predetermined amount, and the direct voltage of the second driving voltage is changed from the center value by the predetermined amount so that the direct voltages of the first and second driving voltages are oppositely changed with reference to the center value, respectively. Further, the sensor may further include a memory for memorizing an address corresponding to the predetermined amount; and a memory control circuit for reading out the address from the memory and for applying the first and second driving voltages to the driving purpose fixed electrodes in the first and second vibrators, respectively, the first and second driving voltages being changed by the predetermined amount.

Alternatively, the one of the alternating voltages in the first and second driving voltages may be controlled in such a manner that the alternating voltage of the first driving voltage is changed from a center value between the alternating voltages of the first and second driving voltages by a predetermined amount, and the alternating voltage of the second driving voltage is changed from the center value by the predetermined amount so that the alternating voltages of the first and second driving voltages are oppositely changed with reference to the center value, respectively. Further, the sensor may further include a memory for memorizing an address corresponding to the predetermined amount; and a memory control circuit for reading out the address from the memory and for applying the first and second driving voltages to the driving purpose fixed electrodes in the first and second vibrators, respectively, the first and second driving voltages being changed by the predetermined amount.

Alternatively, the one of duty ratios of the first and second driving voltages may be controlled in such a manner that the duty ratio of the first driving voltage is changed from a center value between the duty ratios of the first and second driving voltages by a predetermined amount, and the duty ratio of the second driving voltage is changed from the center value by the predetermined amount so that the duty ratios of the first and second driving voltages are oppositely changed with reference to the center value, respectively. Further, the sensor may further include a memory for memorizing an address corresponding to the predetermined amount; and a memory control circuit for reading out the address from the memory and for applying the first and second driving voltages to the driving purpose fixed electrodes in the first and second vibrators, respectively, the first and second driving voltages being changed by the predetermined amount.

Alternatively, a symmetry between the first and second vibrators may be a left-right symmetry. The first vibrator is disposed on a left side of the support substrate, and the second vibrator is disposed on a right side of the support substrate. The first side driving purpose fixed electrode in the first vibrator is disposed on a left side of the first vibrator, and the second side driving purpose fixed electrode in the first vibrator is disposed on a right side of the first vibrator. The first side driving purpose fixed electrode in the second vibrator is disposed on a left side of the second vibrator, and the second side driving purpose fixed electrode in the second vibrator is disposed on a right side of the second vibrator.

According to a second aspect of the present disclosure, a method for operating an angular velocity sensor, which includes a support substrate and first and second vibrators, is provided. Each vibrator includes a movable portion and a fixed portion. The movable portion of each vibrator has a driving purpose movable electrode and a detecting purpose movable electrode. The movable portion is movably supported on the support substrate so that the movable portion is movable in a horizontal direction parallel to a surface of the support substrate. The fixed portion of each vibrator has a driving purpose fixed electrode and a detecting purpose fixed electrode. The fixed portion is fixed on the support substrate. The driving purpose fixed electrode faces the driving purpose movable electrode, and the detecting purpose fixed electrode faces the detecting purpose movable electrode. The first vibrator has a predetermined construction, which is symmetric to a construction of the second vibrator. The movable portion of each vibrator has a part capable of vibrating in a vibration direction parallel to the horizontal direction by applying a driving voltage between the driving purpose fixed electrode and the driving purpose movable electrode. The part of movable portion of each vibrator is capable of oscillating in an oscillation direction perpendicular to the vibration direction by a Coriolis force, which is generated by an angular velocity applied to the part of the movable portion. A capacitance between the detecting purpose fixed electrode and the detecting purpose movable electrode is changeable in accordance with an oscillation of the part of the movable portion. The angular velocity is detected based on a capacitance change between the detecting purpose fixed electrode and the detecting purpose movable electrode. The driving purpose fixed electrode in the first vibrator includes a first side driving purpose fixed electrode and a second side driving purpose fixed electrode. The driving purpose fixed electrode in the second vibrator includes a first side driving purpose fixed electrode and a second side driving purpose fixed electrode. The driving voltage applied to the first side driving purpose fixed electrode in the first vibrator is defined as a first driving voltage, and the driving voltage applied to the second side driving purpose fixed electrode in the second vibrator is the first driving voltage. The first driving voltage includes a direct voltage defined as A volts and an alternating voltage defined as B volts so that the first driving voltage is described as A+B volts. The driving voltage applied to the second side driving purpose fixed electrode in the first vibrator is defined as a second driving voltage, and the driving voltage applied to the first side driving purpose fixed electrode in the second vibrator is the second driving voltage. The second driving voltage includes a direct voltage defined as C volts and an alternating voltage defined as D volts so that the second driving voltage is described as C+D volts, and the alternating voltage of the first driving voltage has a predetermined phase, which is opposite to a phase of the alternating voltage of the second driving voltage. The method includes: vibrating the first and second vibrators by applying the first and second driving voltages to the driving purpose fixed electrodes in the first and second vibrators, respectively; monitoring a sensor output with applying a predetermined acceleration; controlling at least one of the direct voltages in the first and second driving voltages in such a manner that the one of the direct voltages is changed by a predetermined amount with reference to a predetermined center value of the direct voltages, controlling at least one of the alternating voltages in the first and second driving voltages in such a manner that the one of the alternating voltages is changed by a predetermined amount with reference to a predetermined center value of the alternating voltages, or controlling at least one of duty ratios of the first and second driving voltages that are set to be a rectangular wave in such a manner that the one of the duty ratios is changed by a predetermined amount with reference to a center value of the duty ratios of the rectangular waves; and memorizing information about the predetermined amount in a memory when the sensor output is minimized.

In the above method, the output caused by an external acceleration is sufficiently cancelled, so that the output attributed to the acceleration is minimized.

Alternatively, the controlling may include: changing at least one of the direct voltages in the first and second driving voltages with reference to the center value between the direct voltages of the first and second driving voltages; and changing at least one of the alternating voltages in the first and second driving voltages with reference to the center value between the alternating voltages of the first and second driving voltages after changing at least one of the direct voltages. Further, the memorizing may include: memorizing an address corresponding to the predetermined amount of the first and second driving voltages in the memory.

Alternatively, the controlling may include: changing at least one of the direct voltages in the first and second driving voltages with reference to the center value between the direct voltages of the first and second driving voltages; and changing at least one of duty ratios of the first and second driving voltages with reference to the center value between the duty ratios of the first and second driving voltages after changing at least one of the direct voltages. Further, the memorizing may include: memorizing an address corresponding to the predetermined amount of the first and second driving voltages in the memory.

Alternatively, the controlling may include: changing at least one of the alternating voltages in the first and second driving voltages with reference to the center value between the alternating voltages of the first and second driving voltages; and changing at least one of duty ratios of the first and second driving voltages with reference to the center value between the duty ratios of the first and second driving voltages after changing at least one of the alternating voltages. Further, the memorizing may include: memorizing an address corresponding to the predetermined amount of the first and second driving voltages in the memory.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An angular velocity sensor comprising:

a support substrate; and first and second vibrators disposed on the support substrate, wherein each vibrator includes a movable portion and a fixed portion, the movable portion of each vibrator has a driving purpose movable electrode and a detecting purpose movable electrode, the movable portion is movably supported on the support substrate so that the movable portion is movable in a horizontal direction parallel to a surface of the support substrate, the fixed portion of each vibrator has a driving purpose fixed electrode and a detecting purpose fixed electrode, the fixed portion is fixed on the support substrate, the driving purpose fixed electrode faces the driving purpose movable electrode, and the detecting purpose fixed electrode faces the detecting purpose movable electrode, the first vibrator has a predetermined construction, which is symmetric to a construction of the second vibrator, the movable portion of each vibrator has a part capable of vibrating in a vibration direction parallel to the horizontal direction by applying a driving voltage between the driving purpose fixed electrode and the driving purpose movable electrode, the part of movable portion of each vibrator is capable of oscillating in an oscillation direction perpendicular to the vibration direction by a Coriolis force, which is generated by an angular velocity applied to the part of the movable portion, a capacitance between the detecting purpose fixed electrode and the detecting purpose movable electrode is changeable in accordance with an oscillation of the part of the movable portion, the angular velocity is detected based on a capacitance change between the detecting purpose fixed electrode and the detecting purpose movable electrode, the driving purpose fixed electrode in the first vibrator includes a first side driving purpose fixed electrode and a second side driving purpose fixed electrode, the driving purpose fixed electrode in the second vibrator includes a first side driving purpose fixed electrode and a second side driving purpose fixed electrode, the driving voltage applied to the first side driving purpose fixed electrode in the first vibrator is defined as a first driving voltage, and the driving voltage applied to the second side driving purpose fixed electrode in the second vibrator is the first driving voltage, the first driving voltage includes a direct voltage defined as A volts and an alternating voltage defined as B volts so that the first driving voltage is described as A+B volts, the driving voltage applied to the second side driving purpose fixed electrode in the first vibrator is defined as a second driving voltage, and the driving voltage applied to the first side driving purpose fixed electrode in the second vibrator is the second driving voltage, the second driving voltage includes a direct voltage defined as C volts and an alternating voltage defined as D volts so that the second driving voltage is described as C+D volts, the alternating voltage of the first driving voltage has a predetermined phase, which is opposite to a phase of the alternating voltage of the second driving voltage, and at least one of the direct voltages in the first and second driving voltages is controlled in such a manner that the first vibrator vibrates the movable portion with a predetermined phase, which is opposite to a phase of the movable portion in the second vibrator, at least one of the alternating voltages in the first and second driving voltages is controlled in such a manner that the first vibrator vibrates the movable portion with a predetermined phase, which is opposite to a phase of the movable portion in the second vibrator, or at least one of duty ratios of the first and second driving voltages that are set to be a rectangular wave is controlled with reference to a center value of the duty ratios of the rectangular waves in such a manner that the first vibrator vibrates the movable portion with a predetermined phase, which is opposite to a phase of the movable portion in the second vibrator.

2. The sensor according to claim 1, wherein
the one of the direct voltages in the first and second driving voltages is controlled in such a manner that the direct voltage of the first driving voltage is changed from a center value between the direct voltages of the first and second driving voltages by a predetermined amount, and the direct voltage of the second driving voltage is changed from the center value by the predetermined amount so that the direct voltages of the first and second driving voltages are oppositely changed with reference to the center value, respectively.

3. The sensor according to claim 2, further comprising:
a memory for memorizing an address corresponding to the predetermined amount; and
a memory control circuit for reading out the address from the memory and for applying the first and second driving voltages to the driving purpose fixed electrodes in the first and second vibrators, respectively, the first and second driving voltages being changed by the predetermined amount.

4. The sensor according to claim 1, wherein
the one of the alternating voltages in the first and second driving voltages is controlled in such a manner that the alternating voltage of the first driving voltage is changed from a center value between the alternating voltages of the first and second driving voltages by a predetermined amount, and the alternating voltage of the second driving voltage is changed from the center value by the predetermined amount so that the alternating voltages of the first and second driving voltages are oppositely changed with reference to the center value, respectively.

5. The sensor according to claim 4, further comprising:
a memory for memorizing an address corresponding to the predetermined amount; and
a memory control circuit for reading out the address from the memory and for applying the first and second driving voltages to the driving purpose fixed electrodes in the first and second vibrators, respectively, the first and second driving voltages being changed by the predetermined amount.

6. The sensor according to claim 1, wherein
the one of duty ratios of the first and second driving voltages is controlled in such a manner that the duty ratio of the first driving voltage is changed from a center value between the duty ratios of the first and second driving voltages by a predetermined amount, and the duty ratio of the second driving voltage is changed from the center value by the predetermined amount so that the duty ratios of the first and second driving voltages are oppositely changed with reference to the center value, respectively.

7. The sensor according to claim 6, further comprising:
a memory for memorizing an address corresponding to the predetermined amount; and
a memory control circuit for reading out the address from the memory and for applying the first and second driving voltages to the driving purpose fixed electrodes in the first and second vibrators, respectively, the first and second driving voltages being changed by the predetermined amount.

8. The sensor according to claim 1, wherein
a symmetry between the first and second vibrators is a left-right symmetry, the first vibrator is disposed on a left side of the support substrate, and the second vibrator is disposed on a right side of the support substrate, the first side driving purpose fixed electrode in the first vibrator is disposed on a left side of the first vibrator, and the second side driving purpose fixed electrode in the first vibrator is disposed on a right side of the first vibrator, and the first side driving purpose fixed electrode in the second vibrator is disposed on a left side of the second vibrator, and the second side driving purpose fixed electrode in the second vibrator is disposed on a right side of the second vibrator.

9. A method for operating an angular velocity sensor, which includes a support substrate and first and second vibrators, wherein each vibrator includes a movable portion and a fixed portion, the movable portion of each vibrator has a driving purpose movable electrode and a detecting purpose movable electrode, the movable portion is movably supported on the support substrate so that the movable portion is movable in a horizontal direction parallel to a surface of the support substrate, the fixed portion of each vibrator has a driving purpose fixed electrode and a detecting purpose fixed electrode, the fixed portion is fixed on the support substrate, the driving purpose fixed electrode faces the driving purpose movable electrode, and the detecting purpose fixed electrode faces the detecting purpose movable electrode, the first vibrator has a predetermined construction, which is symmetric to a construction of the second vibrator, the movable portion of each vibrator has a part capable of vibrating in a vibration direction parallel to the horizontal direction by applying a driving voltage between the driving purpose fixed electrode and the driving purpose movable electrode, the part of movable portion of each vibrator is capable of oscillating in an oscillation direction perpendicular to the vibration direction by a Coriolis force, which is generated by an angular velocity applied to the part of the movable portion, a capacitance between the detecting purpose fixed electrode and the detecting purpose movable electrode is changeable in accordance with an oscillation of the part of the movable portion, the angular velocity is detected based on a capacitance change between the detecting purpose fixed electrode and the detecting purpose movable electrode, the driving purpose fixed electrode in the first vibrator includes a first side driving purpose fixed electrode and a second side driving purpose fixed electrode, the driving purpose fixed electrode in the second vibrator includes a first side driving purpose fixed electrode and a second side driving purpose fixed electrode, the driving voltage applied to the first side driving purpose fixed electrode in the first vibrator is defined as a first driving voltage, and the driving voltage applied to the second side driving purpose fixed electrode in the second vibrator is the first driving voltage, the first driving voltage includes a direct voltage defined as A volts and an alternating voltage defined as B volts so that the first driving voltage is described as A+B volts, the driving voltage applied to the second side driving purpose fixed electrode in the first vibrator is defined as a second driving voltage, and the driving voltage applied to the first side driving purpose fixed electrode in the second vibrator is the second driving voltage, the second driving voltage includes a direct voltage defined as C volts and an alternating voltage defined as D volts so that the second driving voltage is described as C+D volts, and the alternating voltage of the first driving voltage has a predetermined phase, which is opposite to a phase of the alternating voltage of the second driving voltage, the method comprising:

vibrating the first and second vibrators by applying the first and second driving voltages to the driving purpose fixed electrodes in the first and second vibrators, respectively;

monitoring a sensor output with applying a predetermined acceleration;

controlling at least one of the direct voltages in the first and second driving voltages in such a manner that the one of the direct voltages is changed by a predetermined amount with reference to a predetermined center value of the direct voltages, controlling at least one of the alternating voltages in the first and second driving voltages in such a manner that the one of the alternating voltages is changed by a predetermined amount with reference to a predetermined center value of the alternating voltages, or controlling at least one of duty ratios of the first and second driving voltages that are set to be a rectangular wave in such a manner that the one of the duty ratios is changed by a predetermined amount with reference to a center value of the duty ratios of the rectangular waves; and memorizing information about the predetermined amount in a memory when the sensor output is minimized.

10. The method according to claim 9, wherein the one of the direct voltages in the first and second driving voltages is controlled in such a manner that the direct voltage of the first driving voltage is changed from the center value between the direct voltages of the first and second driving voltages by the predetermined amount, and the direct voltage of the second driving voltage is changed from the center value by the predetermined amount so that the direct voltages of the first and second driving voltages are oppositely changed with reference to the center value, respectively.

11. The method according to claim 10, wherein the memorizing includes:

memorizing an address corresponding to the predetermined amount of the first and second driving voltages in the memory.

12. The method according to claim 9, wherein the one of the alternating voltages in the first and second driving voltages is controlled in such a manner that the alternating voltage of the first driving voltage is changed from the center value between the alternating voltages of the first and second driving voltages by the predetermined amount, and the alternating voltage of the second driving voltage is changed from the center value by the predetermined amount so that the alternating voltages of the first and second driving voltages are oppositely changed with reference to the center value, respectively.

13. The method according to claim 12, wherein the memorizing includes:

memorizing an address corresponding to the predetermined amount of the first and second driving voltages in the memory.

14. The method according to claim 9, wherein the one of duty ratios of the first and second driving voltages is controlled in such a manner that the duty ratio of the first driving voltage is changed from the center value between the duty ratios of the first and second driving voltages by the predetermined amount, and the duty ratio of the second driving voltage is changed from the center value by the predetermined amount so that the duty ratios of the first and second driving voltages are oppositely changed with reference to the center value, respectively.

15. The method according to claim 14, wherein the memorizing includes:

memorizing an address corresponding to the predetermined amount of the first and second driving voltages in the memory.

16. The method according to claim 9, wherein
the controlling includes:
    changing at least one of the direct voltages in the first and second driving voltages with reference to the center value between the direct voltages of the first and second driving voltages; and
    changing at least one of the alternating voltages in the first and second driving voltages with reference to the center value between the alternating voltages of the first and second driving voltages after changing at least one of the direct voltages.

17. The method according to claim 9, wherein
the controlling includes:
    changing at least one of the direct voltages in the first and second driving voltages with reference to the center value between the direct voltages of the first and second driving voltages; and
    changing at least one of duty ratios of the first and second driving voltages with reference to the center value between the duty ratios of the first and second driving voltages after changing at least one of the direct voltages.

18. The method according to claim 9, wherein
the controlling includes:
    changing at least one of the alternating voltages in the first and second driving voltages with reference to the center value between the alternating voltages of the first and second driving voltages; and
    changing at least one of duty ratios of the first and second driving voltages with reference to the center value between the duty ratios of the first and second driving voltages after changing at least one of the alternating voltages.

19. The method according to claim 9, wherein
a symmetry between the first and second vibrators is a left-right symmetry,
the first vibrator is disposed on a left side of the support substrate, and the second vibrator is disposed on a right side of the support substrate,
the first side driving purpose fixed electrode in the first vibrator is disposed on a left side of the first vibrator, and the second side driving purpose fixed electrode in the first vibrator is disposed on a right side of the first vibrator, and
the first side driving purpose fixed electrode in the second vibrator is disposed on a left side of the second vibrator, and the second side driving purpose fixed electrode in the second vibrator is disposed on a right side of the second vibrator.

* * * * *